(12) United States Patent
Kattner et al.

(10) Patent No.: US 11,104,299 B2
(45) Date of Patent: Aug. 31, 2021

(54) ELECTRONIC CAR KEY AND COMMUNICATION SYSTEM

(71) Applicant: VOLKSWAGEN AG, Wolfsburg (DE)

(72) Inventors: Robert Kattner, Wolfsburg (DE); André Oberschachtsiek, Braunschweig (DE); Hendrik Decke, Braunschweig (DE)

(73) Assignee: VOLKSWAGEN AG

( * ) Notice: Subject to any disclaimer, the term of this patent is extended or adjusted under 35 U.S.C. 154(b) by 433 days.

(21) Appl. No.: 15/485,736

(22) Filed: Apr. 12, 2017

(65) Prior Publication Data

US 2017/0297530 A1   Oct. 19, 2017

(30) Foreign Application Priority Data

Apr. 19, 2016  (DE) .................... 10 2016 206 571.8

(51) Int. Cl.
*B60R 25/24*    (2013.01)
*G06Q 20/32*    (2012.01)
*G06Q 20/38*    (2012.01)

(52) U.S. Cl.
CPC .......... *B60R 25/24* (2013.01); *G06Q 20/327* (2013.01); *G06Q 20/382* (2013.01); *B60R 2325/108* (2013.01)

(58) Field of Classification Search
None
See application file for complete search history.

(56) References Cited

U.S. PATENT DOCUMENTS

| | | | |
|---|---|---|---|
| 9,365,188 B1* | 6/2016 | Penilla | B60R 25/2018 |
| 2013/0038447 A1 | 2/2013 | Peng et al. | |
| 2013/0041776 A1* | 2/2013 | Schunemann | G06Q 30/02 705/26.41 |
| 2013/0099892 A1* | 4/2013 | Tucker | G07C 9/00309 340/5.61 |
| 2016/0203661 A1* | 7/2016 | Pudar | G07C 9/00571 340/5.25 |
| 2017/0115125 A1* | 4/2017 | Outwater | G08G 1/202 |
| 2020/0223392 A1* | 7/2020 | Kim | B60R 25/24 |

FOREIGN PATENT DOCUMENTS

| | | |
|---|---|---|
| CN | 101784049 A | 7/2010 |
| CN | 102926586 A | 2/2013 |
| CN | 105015489 A | 11/2015 |
| DE | 102012012389 A1 | 1/2013 |

(Continued)

OTHER PUBLICATIONS

Search Report for German Patent Application No. 10 2016 206 571.8; dated Oct. 10, 2016.

(Continued)

*Primary Examiner* — Jamie R Kucab
(74) *Attorney, Agent, or Firm* — Barnes & Thornburg LLP

(57) ABSTRACT

An electronic vehicle key and a communication system wherein the cryptographic material stored in the secure memory of the electronic vehicle key is alterable by a command received from a first communication device or a second communication device to provide multiple vehicles flexibly using personal electronic vehicle key without being dependent, during use, on access to an external database.

16 Claims, 2 Drawing Sheets

(56) References Cited

FOREIGN PATENT DOCUMENTS

| DE | 102011118234 A1 | 5/2013 |
|----|-----------------|--------|
| DE | 102012013450 A1 | 1/2014 |
| DE | 102013017082 A1 | 7/2014 |

OTHER PUBLICATIONS

Office Action for Chinese Patent Application No. 2017102574964; dated Nov. 27, 2018.
Office Action for Chinese Patent Application No. 201710257496.4; dated Apr. 2, 2020.

* cited by examiner

ELECTRONIC CAR KEY AND COMMUNICATION SYSTEM

PRIORITY CLAIM

This patent application claims priority to German Patent Application No. 10 2016 206 571.8, filed 19 Apr. 2016, the disclosure of which is incorporated herein by reference in its entirety.

SUMMARY

Illustrative embodiments relate to an electronic vehicle key and to a communication system.

BRIEF DESCRIPTION OF THE DRAWINGS

The exemplary embodiments are explained with reference to the associated drawings, in which.

DETAILED DESCRIPTION

Figure 1:
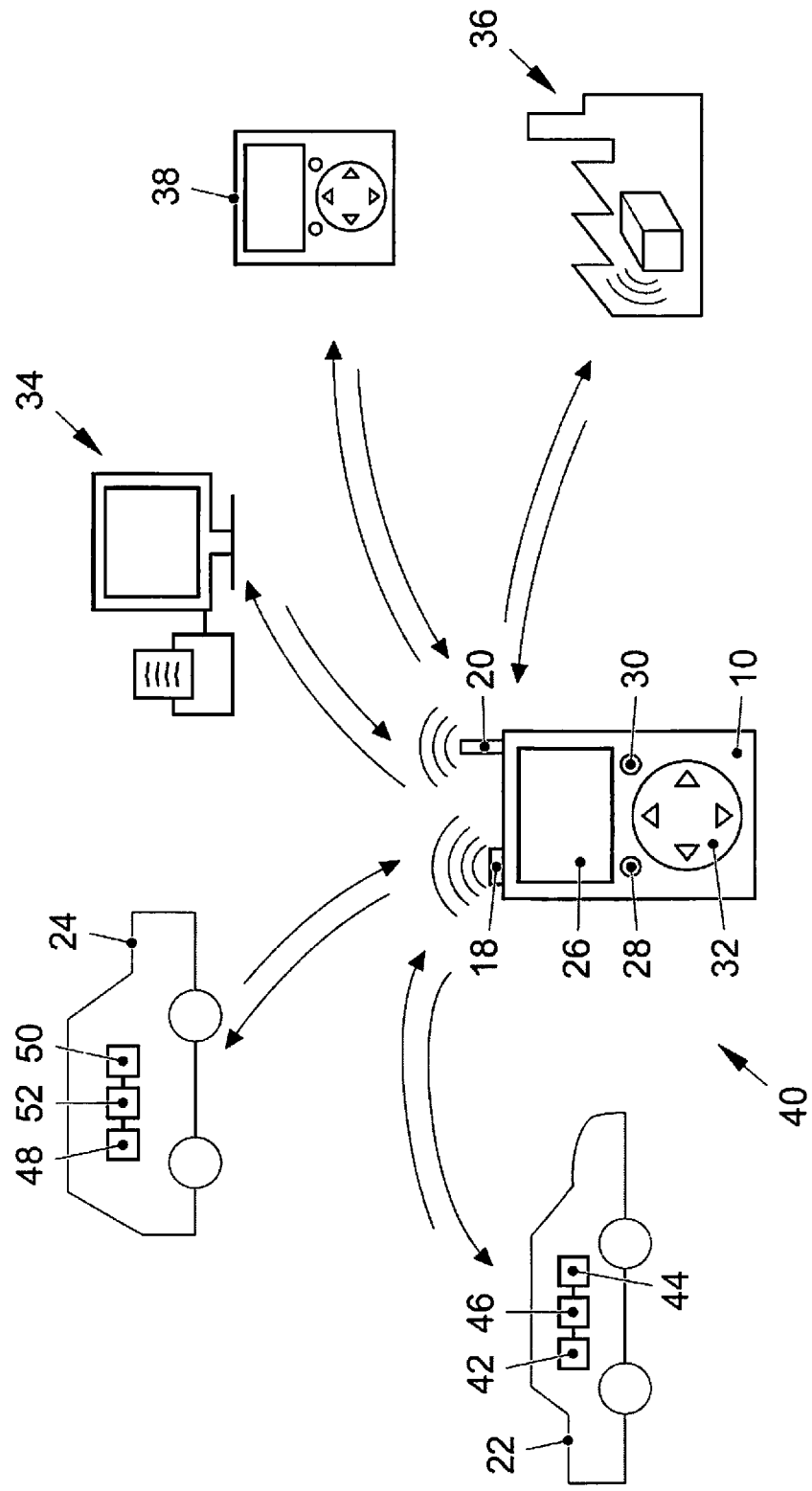
FIG. 1 shows a schematic depiction of a disclosed communication system.

The authorization to use vehicle functions will be managed electronically in future. In this case, it is conceivable for an entity to have individual or all use rights for a vehicle. On the other hand, there will also be increased opportunity in future to be temporarily able to use different vehicles by making use of mobility services of a mobility service provider.

Furthermore, it is foreseeable that it will also be possible in future to purchase individual vehicle functions that can be used with a multiplicity of vehicles in a vehicle fleet. To implement such rights management, known solutions inevitably require allocation of rights to a virtual user account.

For many functions, it will be necessary in future for the user to use this user account to register with a vehicle. Known solutions involve the smartphone of a user in this case, which means that identification and registration can be effected on the basis of a personal object.

Registration with a vehicle requires use authorizations to be checked. In this context, systems are known that, for this purpose, require an Internet connection to a central computer to which, after a user has registered with the vehicle, an appropriate authorization request is sent.

A further solution is known from DE 10 2012 012 389 A1, for example. The communication system proposed in this document comprises a mobile communication device and a control unit in a vehicle. The control unit receives and checks the authorization data sent by the mobile communication device. If the result of this check is positive, then this control unit of the vehicle issues the entry authorization or driving authorization for the vehicle.

The solution proposed in DE 10 2011 118 234 A1 also dispenses with an online check when issuing use authorizations for functions of a vehicle. To this end, a data record to be transmitted to a mobile terminal, for example, to a smartphone, which data record comprises the issued use authorizations, is encrypted by a computer unit of an external device using an apparatus-specific password such that the encrypted data record cannot be read and decrypted by the mobile terminal.

DE 10 2013 017 082 A1 is concerned with an entry or driving authorization system for a vehicle. This entry or driving authorization system comprises authorization data for enabling the entry or driving authorization, a first mobile terminal for transmitting the authorization data to the vehicle and a first transmission link for transmitting the authorization data from a database server to the first mobile terminal. The first mobile terminal has a data storage medium for securely storing the authorization data for the vehicle. The first transmission link is encrypted using a first key. A second key is transmittable from the database server to the first mobile terminal by means of the first transmission link encrypted using the first key, and the authorization data are transmittable from the first mobile terminal to a second mobile terminal by means of a second transmission link encrypted using the second key.

DE 10 2012 013 450 A1 relates to a method for controlling an entry or driving authorization for a vehicle. In this case, a mobile communication device is used to request entry or driving authorization data from a database server. The database server checks an authorization of the mobile communication device to request these entry or driving authorization data. If the result is positive, then the entry or driving authorization data are transmitted from the database server to the mobile communication device and from the mobile communication device to the vehicle to obtain the entry or driving authorization for the vehicle.

Disclosed embodiments provide a way of being able to use multiple vehicles flexibly using a personal electronic vehicle key without being dependent, during use, on access to an external database.

The disclosed electronic vehicle key comprises a memory that is protected against reading and modification and that stores cryptographic material. The cryptographic material contains use authorizations of the vehicle key holder for functions of at least one vehicle. Further, the disclosed electronic vehicle key has a first communication device and a second communication device. The first communication device is set up to communicate using near field communication (NFC). The second communication device is set up to communicate using a radio link that uses a different frequency than the first communication device. The second communication device may, by way of example, be set up to communicate using a Bluetooth link, a WLAN link or a mobile radio link. The use authorizations of the vehicle key holder for functions of the at least one vehicle are communicated directly to the at least one vehicle by means of the first communication device and/or the second communication device. According to the disclosed embodiments, the electronic vehicle key is set up such that the cryptographic material stored in the secure memory is alterable by means of a command received from the first communication device or the second communication device.

The disclosed electronic vehicle key may use the secure memory to securely store cryptographic material, such as cryptographic key material, cryptographic certificates, authorization files and entity-related data, that is to say also biometric data, and it is secondly possible for the cryptographic material to be altered by the first communication device or the second communication device. As such, the use authorizations securely stored on the vehicle key for functions of one or more vehicles can be adapted, for example, when the vehicle key holder sells a vehicle, purchases a new vehicle or buys an authorization to use one or more vehicle functions on a multiplicity of vehicles. Alteration of the use authorizations stored in the electronic vehicle key can therefore replace issue of a new vehicle key, for example. Similarly, alteration of the use authorizations stored in the electronic vehicle key can be used instead of vehicle key handover when a vehicle is sold. Similarly, the electronic vehicle key can be used to store individual use rights, such as access to all vehicles in a vehicle fleet, for example. As such, the vehicle key holder can theoretically use the electronic vehicle key as an identification feature for a checking entity, for example, for a vehicle manufacturer or a service provider, for life. The long usability also allows the vehicle key to be adapted visually to suit the vehicle key holder on an individual basis. The long period of use justifies the high manufacturing outlay for a multiplicity of users and the associated production costs for a personal and unique vehicle key of this kind. In addition, the holder of the electronic vehicle key does not need to use a smartphone to be able to use functions of multiple vehicles using just one device or to be able to use functions in a vehicle that have been paid for in advance. In this case, the use authorizations may be stored directly on the electronic vehicle key and do not first need to be synchronized via the Internet. Authentication on a vehicle or the activation of individual vehicle functions can therefore be effected directly by means of the electronic vehicle key. Further, the first communication device, which communicates using near field communication, is also usable when the energy store of the electronic vehicle key is discharged. For communication between the electronic vehicle key and the at least one vehicle, a bilaterally authenticated link that is completely encrypted may be set up. Optionally, encryption is effected on the basis of the transport layer security (TLS) protocol. This protocol provides a high level of security and is already widely used on the Internet. As a prerequisite, this requires a public key infrastructure (PKI) to exist that provides both the electronic vehicle key and the at least one vehicle with cryptographic certificates. These cryptographic certificates can be introduced into the secure memory of the electronic vehicle key and into the vehicle-internal memory during production and/or updated using customary update mechanisms.

The electronic vehicle key may be set up such that it stores further specific data of the vehicle key holder, such as one or more seat settings, optionally interior air conditioning or an engine or chassis setting, for example. The electronic vehicle key may moreover store further data that arise when the electronic vehicle key is used in conjunction with other services, for example, for using the electronic vehicle key as an authorization token for cashless payments or as an identification token for identity verification. The associated data may be stored in the secure memory of the electronic vehicle key and/or in a further memory of the electronic vehicle key.

Optionally, the electronic vehicle key comprises a control unit that is connected in a signal-conducting manner to the secure memory, the first communication device and the second communication device. The control unit allows evaluation and processing of data and also control of the secure memory, the first communication device and the second communication device.

The first communication device may be designed for automatic and contactless identification and/or location of objects, particularly vehicles. Optionally, the first communication device is set up to use the RFID (radio frequency identification) standard. The second communication device may be set up to communicate using Bluetooth, for example, in Low Energy Version 4.0. These communication standards have become established in a large number of the sectors in which radio communication is used and therefore allow high compatibility with other radio systems that have already been introduced.

The cryptographic material can contain use authorizations of the vehicle key holder for functions of multiple vehicles. These use authorizations can then be communicated directly to the multiple vehicles by means of the electronic vehicle key. It is therefore also possible for the electronic vehicle key to be used for multiple vehicles at the same time, so that there is then no need for users to possess multiple vehicle keys.

The electronic vehicle key can have one or more display elements. This may be an LCD, TFT or LED display or a touchscreen, for example. Alternatively or additionally, the electronic vehicle key can have one or more input elements. The one or more input elements may be in pressure-sensitive form and, by way of example, embodied as pushbuttons or as a touchscreen. The display elements and/or input elements can be used to effect manual operation of the electronic vehicle key. Optionally, the electronic vehicle key is set up to display to the vehicle key holder, by means of a display element, a menu structure that allows the vehicle key holder to retrieve information manually and to make settings. By way of example, the display element can be used to retrieve information about the electronic vehicle key, such as an identifier or an ID and/or a software version. Further, the menu can be used to make display settings or settings for the first communication device and/or the second communication device. If the electronic vehicle key stores use rights for multiple vehicles, then the menu structure can be used to manually select a vehicle and/or a specific vehicle function. The display element can moreover provide information about purchases made, for example, about functions bought or about existing subscriptions.

The electronic vehicle key may be set up to automatically detect the at least one vehicle for which the cryptographic material contains use authorizations of the vehicle key holder. By way of example, detection can be effected using the first communication device and/or the second communication device. Automatic detection may be effected as soon as a vehicle is in a range in which the first communication device or the second communication device receives signals. When the vehicle key holder approaches a corresponding vehicle that has been parked in a parking space beforehand, for example, automatic detection of this vehicle can be used by the electronic vehicle key as a basis for implementing further functions.

In a disclosed embodiment, the electronic vehicle key is set up to, on detection of the at least one vehicle, automatically communicate use authorizations to the at least one vehicle. Alternatively or additionally, the electronic vehicle key may be set up to, on detection of the at least one vehicle, automatically make a menu selection and propose to the vehicle key holder, by means of a display element, an action relating to the at least one vehicle. By way of example, this may be automatic unlocking of the vehicle. Alternatively or additionally, the vehicle key holder can be prompted to open the trunk or to switch on the lights. If the electronic vehicle key stores use rights for functions of multiple vehicles, then the vehicle key holder, on approaching one of these vehicles, has a selection of functions pertaining to this vehicle proposed to him. Alternatively, the vehicle key holder can be prompted to enable all functions of this vehicle. Following the proposal by a display element of the electronic vehicle key, there is then merely a need for confirmation by the vehicle key holder to enable and/or perform the vehicle function or the vehicle functions.

The electronic vehicle key may be set up to communicate wirelessly with further communication partners, such as other communication devices and/or other electronic vehicle keys. For the communication with one or more further communication partners, such as a personal computer or a payment device, for example, the electronic vehicle key can be used as an authentication token. Optionally, the first communication device and/or the second communication device is/are used to communicate with other communication partners. By way of example, the electronic vehicle key can be used to perform two-factor authentication. In this context, possession of the electronic vehicle key can be regarded as a first factor, the second factor being able to be the input of a pin code on the electronic vehicle key or on an input device of the communication partner. Alternatively, the second factor may also be a fingerprint or an iris scan. Further, two-factor authentication is also implementable by performing a gesture. The opportunity to store different cryptographic data in the secure memory of the electronic vehicle key allows authentication to be effected on the basis of a wide variety of technologies, such as mutual authentication on the basis of transport layer security (TLS) and a public key infrastructure (PKI) or using the electronic vehicle key as a transaction number (TAN) generator, for example.

The electronic vehicle key may be set up to use the first communication device to set up a secure communication link to a communication partner and, following setup of the secure communication link, to use the second communication device to communicate with the communication partner. As a result of the first communication device using near field communication, processes can be initiated by holding the electronic vehicle key against the communication partner. Following initiation, the communication channel of the second communication device can then be used to effect data interchange even over longer distances. The communication and the transmitted data are protected by means of a cryptographic concept in this case. The electronic vehicle key and the communication partner have a bilaterally authenticated connection set up between them that is completely encrypted. Optionally, encryption is effected on the basis of the transport layer security (TLS) protocol. This protocol provides a high level of security and is already widely used on the Internet. As a prerequisite, this requires a public key infrastructure (PKI) to exist that provides both the electronic vehicle key and the communication partners with cryptographic certificates. These cryptographic certificates can be introduced into the devices during production and updated using customary update mechanisms.

In a disclosed embodiment, the electronic vehicle key is set up to communicate wirelessly with a payment device. The payment device may be embodied as an electronic checkout system and can likewise be understood as a communication partner within the context of the disclosed embodiments. In this disclosed embodiment, the cryptographic material in the secure memory of the electronic vehicle key contains payment information that the vehicle key holder can use to make payments directly on the payment device. Hence, the electronic vehicle key can also be used for payment services. Optionally, the electronic vehicle key is set up such that the first communication device is used for communication with the payment device. The vehicle key holder can hold the electronic vehicle key against the payment device as a result of the near field communication property of the first communication device, whereupon the amount to be paid appears on a display element of the electronic vehicle key or a display unit of the payment device. This amount can be confirmed by an input element of the electronic vehicle key or an input unit of the payment device. By way of example, if a limit value amount is exceeded, then an additional pin code input may also be necessary for confirmation.

The electronic vehicle key may be set up to transmit use authorizations for functions of the at least one vehicle to another electronic vehicle key using the first communication device and/or the second communication device. Other electronic vehicle keys are likewise intended to be understood as communication partners within the context of the disclosed embodiments. Optionally, the electronic vehicle key is set up such that use authorizations for functions of the at least one vehicle are transmitted to another electronic vehicle key while assigning an authorization period. This is beneficial when using valet parking or when using parking services that involve third parties parking the vehicle on behalf of the actual vehicle driver. Holding the electronic vehicle key of the actual vehicle driver against the electronic vehicle key of the instructed third party therefore allows a temporally and/or locally limited use authorization for selected or all functions of the vehicle to be transmitted from the electronic vehicle key of the actual vehicle driver to the electronic vehicle key of the instructed third party. The latter can therefore park the vehicle without a physical vehicle key having been handed over. As a result of only a limited use authorization having been transmitted, the risk of misuse, for example, as a result of a vehicle theft, is substantially reduced.

The electronic vehicle key may be set up to be usable as an authentication token for a user account, the user account may store all use authorizations of the vehicle key holder and also the entity-related information thereof. The data stored in the user account may therefore also be usable via different authentication paths, such as by means of the input of a user name and an associated password via the Internet, for example. Furthermore, the electronic vehicle key can be added to an existing user account. This may be useful if the vehicle key holder already has a user account that he has already used via his smartphone but intends to use the electronic vehicle key in future. Optionally, the electronic vehicle key is set up such that it can only ever be allocated one user account at the same time. It is possible for there to be a protective mechanism stored that prevents a user account from being able to be erased from the electronic vehicle key or for the electronic vehicle key to be assigned to a different user account. By way of example, the electronic vehicle key is set up such that the user account can be changed only by authorized stations, such as workshops and dealers, for example. Similarly, protection is implementable by the need for a pin code input.

In a disclosed embodiment, the electronic vehicle key comprises a communication device that the electronic vehicle key can use to set up an Internet connection. This allows a connection to be set up to a central computer, for example, which connection can be used to transmit data to the electronic vehicle key, for example, use authorizations for a new vehicle.

The disclosed communication system comprises an electronic vehicle key and a vehicle. The electronic vehicle key is in a form according to at least one of the embodiments described above. The vehicle has a vehicle-internal memory that stores cryptographic material, and a vehicle-internal communication unit. The cryptographic material in the memory of the vehicle allows encrypted communication with the electronic vehicle key, so that the vehicle key holder can use the electronic vehicle key to communicate use authorizations for functions of the vehicle directly to the vehicle. The same benefits and modifications as described above apply.

The various embodiments that are cited in this application are, unless stated otherwise on a case by case basis, combinable with one another.

FIG. 1 shows a communication system 40 with an electronic vehicle key 10, a first vehicle 22, a second vehicle 24, a first communication device 34, for example, a payment device, a second communication device 36, for example, a central computer of a vehicle manufacturer, and a further electronic vehicle key 38. The fixed parts of the communication system 40 are the electronic vehicle key 10 and at least one of the vehicles 22 and 24. The further components 34, 36 and 38 are optional parts. Depending on the application, the parts of the communication system 40 can also change over time, for example, the first vehicle 22 is a part in one period and the second vehicle 24 is part of the communication system 40 in a second period.

The electronic vehicle key 10 comprises a first communication device 18, which is set up to communicate using near field communication, and a second communication device 20, which is set up to communicate using a radio link. The first communication device 18 is set up to communicate using the NFC (near field communication) standard. The second communication device 20 is set up to communicate using the Bluetooth standard.

Further, the electronic vehicle key 10 has a display element 26, for example, an LCD display, and multiple input elements 28, 30, 32. The multiple input elements 28, 30, 32 are pushbuttons, the input elements 28, 30 being suitable for selecting menu options, which are displayed in the bottom left corner and in the bottom right corner of the display element 26. The input element 32 comprises a total of four keys, the four keys being set up to navigate through a menu structure displayed by the display element 26. The input element 32 comprises a key for each of the following actions: up, down, left, right.

Furthermore, the electronic vehicle key 10 comprises a secure memory (see FIG. 2) that stores cryptographic material. The cryptographic material contains use authorizations of the vehicle key holder for functions of the two vehicles 22 and 24. The use authorizations of the vehicle key holder for functions of the two vehicles 22 and 24 are communicated directly to the two vehicles 22 and 24 by means of the first communication device 18 and the second communication device 20. The electronic vehicle key 10 is set up such that the cryptographic material stored in the secure memory is alterable using a command received from the first communication device 18 or the second communication device 20.

The first vehicle 22 has a vehicle-internal memory 42, a vehicle-internal communication unit 44 and a vehicle-internal computation unit 46. The vehicle-internal computation unit 46 is connected in a signal-conducting manner to the vehicle-internal memory 42 and the vehicle-internal communication unit 44. The vehicle-internal computation unit 46 allows evaluation and processing of data and also control of the vehicle-internal memory 42 and the vehicle-internal communication unit 44. The vehicle-internal memory 42 stores cryptographic material. The cryptographic material in the vehicle-internal memory 42 of the vehicle 22 allows encrypted communication with the electronic vehicle key 10. The encrypted communication can be used by the vehicle key holder to communicate the use authorizations for functions of the vehicle 22 directly to the vehicle 22.

The second vehicle 24 likewise has a vehicle-internal memory 48, a vehicle-internal communication unit 50 and a vehicle-internal computation unit 52. The vehicle-internal computation unit 52 is connected in a signal-conducting manner to the vehicle-internal memory 48 and the vehicle-internal communication unit 50. The vehicle-internal computation unit 52 allows evaluation and processing of data and also control of the vehicle-internal memory 48 and of the vehicle-internal communication unit 50. The vehicle-internal memory 48 stores cryptographic material. The cryptographic material in the vehicle-internal memory 48 of the vehicle 24 allows encrypted communication with the electronic vehicle key 10. The encrypted communication can be used by the vehicle key holder to communicate the use authorizations for functions of the vehicle 24 directly to the vehicle 24.

The electronic vehicle key 10 is set up to detect the vehicles 22 and 24 automatically. Detection is effected using the second communication device 20 as soon as one of the vehicles 22 or 24 is in an area in which the second communication device 20 receives signals from one of the vehicles 22 or 24. On detection of one of the vehicles 22 or 24, the electronic vehicle key 10 uses a display element to propose an action relating to the detected vehicle. By way of example, this may be automatic unlocking of the vehicle 22 or 24. Alternatively or additionally, the vehicle key holder can be prompted to open the trunk or to switch on the lights. If, as in this example, the electronic vehicle key 10 stores use rights for functions of multiple vehicles 22, 24, then the vehicle key holder, on approaching one of these vehicles, has a selection of functions pertaining to this vehicle 22, 24 proposed to him.

The first communication device 34, for example, a payment device, is part of a checkout system. The cryptographic material in the secure memory of the electronic vehicle key 10 contains payment information that the vehicle key holder can use to make payments directly on the payment device 34. Hence, the electronic vehicle key 10 can be used for payment services. The electronic vehicle key 10 is set up such that communication with the payment device 34 involves the first communication device 18 being used. The vehicle key holder can hold the electronic vehicle key 10 against the payment device 34 as a result of the near field communication property of the first communication device 18, whereupon the amount to be paid appears on the display element 26 of the electronic vehicle key 10. This amount can be confirmed by the input element 30 of the electronic vehicle key 10.

The second communication device 36, for example, a central computer of a vehicle manufacturer, comprises a database that stores all user accounts created with the vehicle manufacturer and the associated data of the accounts. The electronic vehicle key 10 is set up to set up an Internet connection to the central computer 36. Hence, data, for example, additional use authorizations for one of the vehicles 22, 24, can be transmitted from the central computer to the electronic vehicle key 10.

The further electronic vehicle key 38 has the same structural design as the electronic vehicle key 10. The electronic vehicle keys 10, 38 are set up to wirelessly communicate with other electronic vehicle keys 10, 38. Furthermore, the electronic vehicle key 10 is set up to transmit use authorizations for functions of the vehicles 22 and 24 to the electronic vehicle key 38 by means of the first communication device 18 and the second communication device 20. At the same time as the use authorizations are transmitted, an authorization period is assigned. During communication between the two electronic vehicle keys 10, 38, a secure communication link is set up by means of the first communication device 18 using near field communication. Following setup of the secure communication link, the further communication is effected by the second communication device 20.

Figure 2:
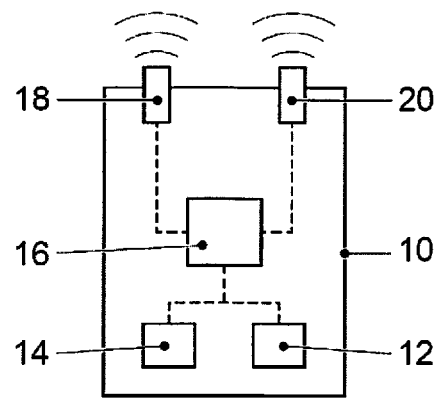
FIG. 2 shows a schematic depiction of a disclosed electronic vehicle key.

FIG. 2 shows an electronic vehicle key 10. The electronic vehicle key 10 comprises a secure memory 12, a further memory 14, a control unit 16 a first communication device 18 and a second communication device 20.

The control unit 16 is connected in a signal-conducting manner to the secure memory 12, the further memory 14, the first communication device 18 and the second communication device 20. The control unit 16 allows evaluation and processing of data and also control of the secure memory 12, of the further memory 14, of the first communication device 18 and of the second communication device 20.

The secure memory 12 stores cryptographic material, the cryptographic material containing use authorizations of the vehicle key holder for functions of a vehicle. The first communication device 18 is set up to communicate using near field communication. The second communication device 20 is set up to communicate using a radio link.

The use authorizations of the vehicle key holder for functions of the vehicle are demonstrable directly to the vehicle by means of the first communication device 18 and the second communication device 20. The electronic vehicle key 10 is moreover set up such that the cryptographic material stored in the secure memory 12 is alterable using a command received from the first communication device or the second communication device.

The further memory 14 stores specific data of the vehicle key holder, namely multiple seat settings, an interior air conditioning and also engine and chassis settings, for example. Moreover, the further memory 14 stores further data that arise when the electronic vehicle key 10 is used in conjunction with other services, for example, for using the electronic vehicle key 10 as an authorization token for cashless payments or as an identification token for identity verification. These data are protected by software encryption.

Figure 3:
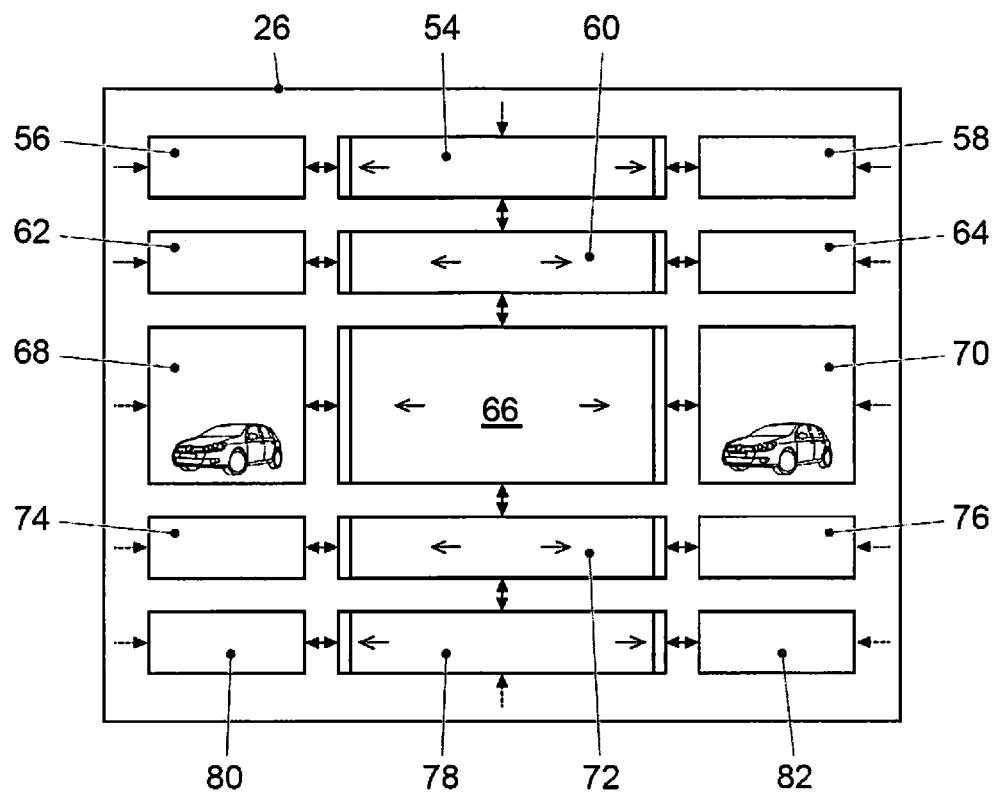
FIG. 3 shows an exemplary menu structure of a disclosed electronic vehicle key.

FIG. 3 shows a menu structure displayed on a display element 26 of an electronic vehicle key. The menu structure allows the vehicle key holder, for example, by using one or more input elements, to retrieve information and make settings manually.

The display element 26 can be used to retrieve information about the electronic vehicle key (menu options 54 and 78). In this context, it is possible to retrieve an identifier or an ID (menu options 56 and 80) and the current software version (menu options 58 and 82).

Further, settings (menu option 60) pertaining to the electronic vehicle key can be made. In this context, display settings (menu option 62) and settings pertaining to Bluetooth communication (menu option 64) can be changed and viewed.

The secure memory of the electronic vehicle key belonging to the display element 26 stores use rights pertaining to functions of two vehicles. The menu option 66 can be used to manually select one of the vehicles, namely either vehicle 1 (menu option 68) or vehicle 2 (menu option 70). This allows a specific function of a vehicle to be selected.

The display element 26 moreover provides information pertaining to purchases made (menu option 72), namely about functions bought (menu option 74) and about existing subscriptions (menu option 76).

LIST OF REFERENCE SYMBOLS

10 Electronic vehicle key
12 Secure memory
14 Further memory
16 Control unit
18 First communication device
20 Second communication device
22 Vehicle
24 Vehicle
26 Display element
28 Input element
30 Input element
32 Input element
34 Communication device
36 Communication device
38 Electronic vehicle key
40 Communication system
42 Vehicle-internal memory
44 Vehicle-internal communication unit
46 Vehicle-internal computation unit
48 Vehicle-internal memory
50 Vehicle-internal communication unit
52 Vehicle-internal computation unit
54-82 Menu options

The invention claimed is:
1. An electronic vehicle key comprising:
a secure memory that stores cryptographic material that contains use authorizations of a vehicle key holder for functions of a plurality of vehicles;
a display element configured to detect received user input;
a first communication device configured to communicate using near field communication; and
a second communication device configured to communicate using a radio link,
wherein the second communication device is configured to perform automatic vehicle detection in response to receipt of a signal from one of a plurality of vehicles,
wherein the first communication device and/or the second communication device are configured to directly communicate the use authorizations of the vehicle key holder for functions of the plurality of vehicles to a corresponding one of the plurality of vehicles, and
wherein the cryptographic material stored in the secure memory is alterable in response to and based on a command received via the first communication device or the second communication device, and
wherein, in response to detecting at least one of the plurality of vehicles, a menu structure is displayed on the display element and identifies the detected at least one of the plurality of vehicles for selection by the user input,
wherein the electronic vehicle key is configured to initiate a secure communication link to a communication partner using the first communication device in response to detecting user input selection within the menu structure,
wherein the electronic vehicle key is configured such that the secure communication link is initiated using the near field communication of the first communication device while the electronic vehicle key is placed in proximity to the communication partner, and
wherein the electronic vehicle key is configured such that, following initiation of the secure communication link between the electronic vehicle key and the communication partner, the communication and transmitted data are protected by a fully-encrypted, bilaterally authenticated connection between the electronic vehicle key and the communication partner, wherein the second communication device is used by the electronic vehicle key to communicate with the communication partner using the radio link.

2. The electronic vehicle key of claim 1, wherein the electronic vehicle key is configured to automatically detect each of the plurality of vehicles for which the cryptographic material contains use authorizations of the vehicle key holder.

3. The electronic vehicle key of claim 2, wherein the electronic vehicle key is configured to, in response to detecting the at least one of the plurality of vehicles, display on the display element an action relating to the at least one of the plurality of vehicles.

4. The electronic vehicle key of claim 3, wherein the electronic vehicle key is configured to communicate wirelessly with further communication partners.

5. The electronic vehicle key of claim 4, wherein the further communication partners include at least one of other communication devices and/or other electronic vehicle keys.

6. The electronic vehicle key of claim 4, wherein the electronic vehicle key is configured to communicate wirelessly with a payment device, wherein the cryptographic material contains payment information of the vehicle key holder.

7. The electronic vehicle key of claim 1, wherein the electronic vehicle key is configured to transmit the use authorizations for functions of the at least one vehicle to other electronic vehicle keys using the first communication device and/or the second communication device.

8. A communication system for a vehicle comprising:
an electronic vehicle key including:
a secure memory that stores cryptographic material that contains use authorizations of a vehicle key holder for functions of a plurality of vehicles,
a display element configured to detect received user input,
a first communication device configured to communicate using near field communication, and
a second communication device configured to communicate using a radio link,
wherein the second communication device is configured to perform automatic vehicle detection in response to receipt of a signal from one of a plurality of vehicles,
wherein the first communication device and/or the second communication device are configured to directly communicate the use authorizations of the vehicle key holder for functions of at least one of the plurality of vehicles to another one of the plurality of vehicles,
wherein the cryptographic material stored in the secure memory is alterable in response to and based on a command received via the first communication device or the second communication device,
wherein, in response to detecting at least one of the plurality of vehicles, a menu structure is displayed on the display element and identifies the detected another one of the plurality of vehicles for selection by the user input,
wherein the electronic vehicle key is configured to initiate a secure communication link to a communication partner using the first communication device in response to detecting user input selection within the menu structure,
wherein the electronic vehicle key is configured such that the secure communication link is initiated using the near field communication of the first communication device while the electronic vehicle key is placed in proximity to the communication partner, and
wherein the electronic vehicle key is configured such that, following initiation of the secure communication link between the electronic vehicle key and the communication partner, the communication and transmitted data are protected by a fully-encrypted, bilaterally authenticated connection between the electronic vehicle key and the communication partner, wherein the second communication device is used by the electronic vehicle key to communicate with the communication partner,
wherein the another one of the multiple vehicles comprises a vehicle-internal memory, which stores cryptographic material, and a vehicle-internal communication unit, and
wherein the cryptographic material in the vehicle-internal memory allows encrypted communication with the electronic vehicle key to receive use authorizations for functions of the at least one of the plurality of vehicles from the electronic vehicle key.

9. The communication system of claim 8, wherein the cryptographic material contains use authorizations of the vehicle key holder for functions of plurality of vehicles, and wherein the electronic vehicle key directly communicates the use authorizations of the vehicle key holder for functions of the plurality of vehicles to the plurality of vehicles.

10. The communication system of claim 8, wherein the electronic vehicle key further comprises one or more input elements.

11. The communication system of claim 10, wherein the electronic vehicle key is configured to automatically detect the at least one vehicle for which the cryptographic material contains use authorizations of the vehicle key holder.

12. The communication system of claim 11, wherein the electronic vehicle key is configured to, on detection of the at least one vehicle, automatically communicate use authorizations to the at least one vehicle.

13. The communication system of claim 12, wherein the electronic vehicle key is configured to communicate wirelessly with further communication partners.

14. The communication system of claim 13, wherein the further communication partners include at least one of other communication devices and/or other electronic vehicle keys.

15. The communication system of claim 14, wherein the electronic vehicle key is configured to communicate wirelessly with a payment device, wherein the cryptographic material contains payment information of the vehicle key holder.

16. The communication system of claim 8, wherein the electronic vehicle key is configured to transmit the use authorizations for functions of the at least one of the plurality of vehicles to other electronic vehicle keys using the first communication device and/or the second communication device.

* * * * *